United States Patent [19]

Featherstone et al.

[11] 4,413,451

[45] Nov. 8, 1983

[54] PNEUMATICALLY ACTUATED TILTING TELESCOPING MAST CONSTRUCTION

[75] Inventors: Harry E. Featherstone, Wooster; Alvin R. Steffen, Loudonville, both of Ohio

[73] Assignee: The Will-Burt Company, Orrville, Ohio

[21] Appl. No.: 374,980

[22] Filed: May 5, 1982

[51] Int. Cl.³ .................. E04F 19/00; E04H 14/00
[52] U.S. Cl. ............................. 52/28; 52/110; 52/118; 277/205; 343/902
[58] Field of Search ............ 52/110, 116, 118, 632; 277/205, 212 R, 91, 212 C, 188 R; 92/51, 52, 53; 343/902, 883

[56] References Cited

U.S. PATENT DOCUMENTS

| | | | |
|---|---|---|---|
| 553,509 | 1/1896 | Burnham | 285/302 |
| 1,116,609 | 11/1914 | Mueller et al. | 285/302 |
| 2,172,117 | 9/1939 | Beaufort et al. | 343/902 |
| 2,173,095 | 9/1939 | Byrne | 343/902 |
| 2,214,685 | 9/1940 | Stone | 343/901 |
| 2,371,539 | 3/1945 | Morch | 343/883 |
| 2,914,922 | 12/1959 | Gibson | 343/901 |
| 3,150,563 | 9/1964 | Carrigan | 92/52 |
| 3,430,990 | 3/1969 | Nelson | 277/188 R |
| 3,805,681 | 4/1974 | Wible et al. | 92/52 |

FOREIGN PATENT DOCUMENTS

| | | | |
|---|---|---|---|
| 516988 | 9/1955 | Canada | 343/902 |
| 588938 | 2/1959 | Italy | 92/51 |
| 546480 | 10/1956 | Italy | 277/188 R |

*Primary Examiner*—Alfred C. Perham
*Assistant Examiner*—Mark J. Sofia
*Attorney, Agent, or Firm*—Frease & Bishop

[57] ABSTRACT

The mast has a housing arranged to be mounted on the roof of a vehicle such as an emergency vehicle at the usual location of a vehicle light bar, whether or not a light bar is associated with the mast housing. A seal unit is located at the lower end of each telescoping mast section engaging the next outer mast section. The seal unit leaves the lower end of all mast sections unobstructed so that a tubular passage is formed from end to end of the mast. A retractable power supply cable is located in the passage of supply power to the electrical appliance mounted on the top of the mast. There are electrical plug connectors at each end of the mast for releasable connection with the electrical fixture at the top and with the vehicle power supply at the bottom of the mast. The mast is mounted on an offset pivot which simplifies the pneumatic-actuating system which tilts and telescopes the mast, and also enables the mast to tilt by gravity from telescoped retracted vertical to stored horizontal position. All components for mounting and actuating the mast are contained protectively in the housing.

20 Claims, 16 Drawing Figures

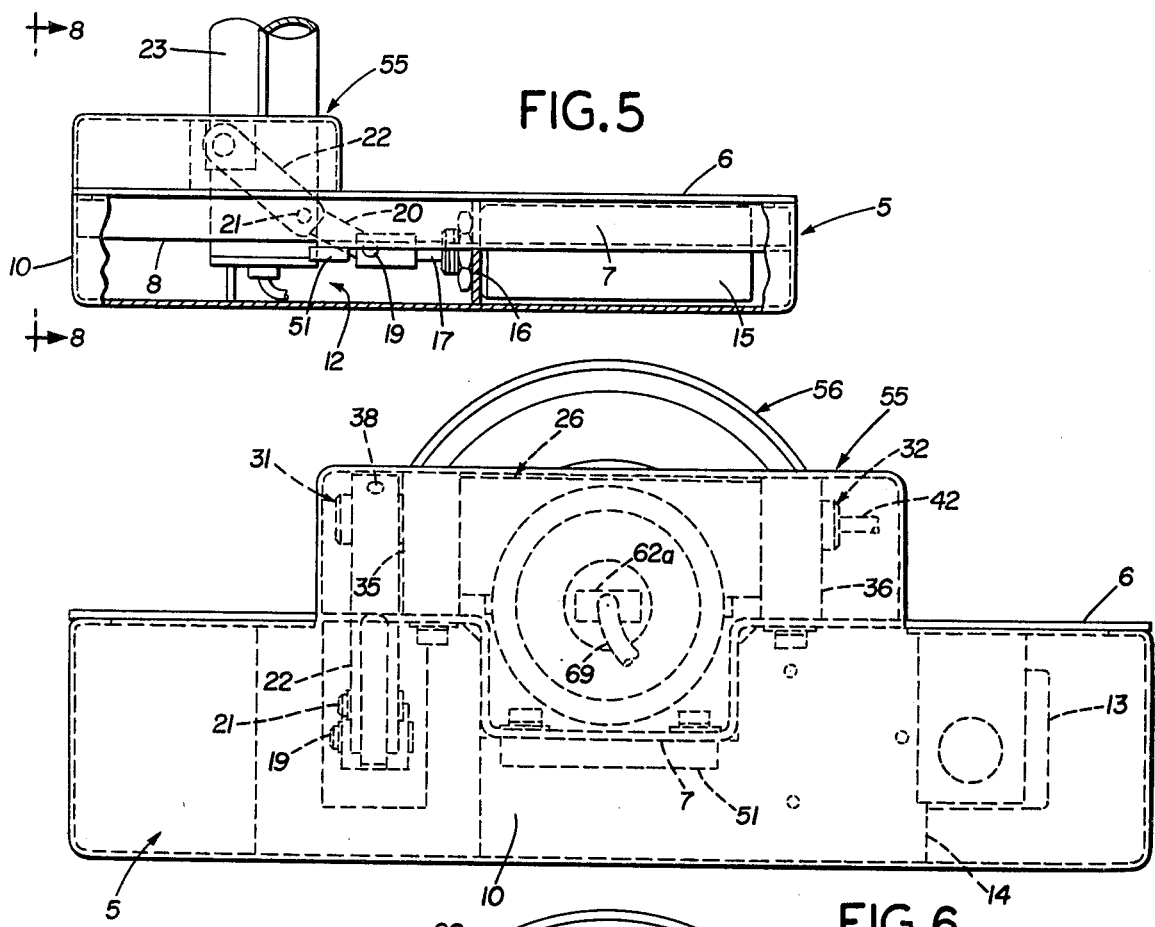
FIG.5
FIG.6
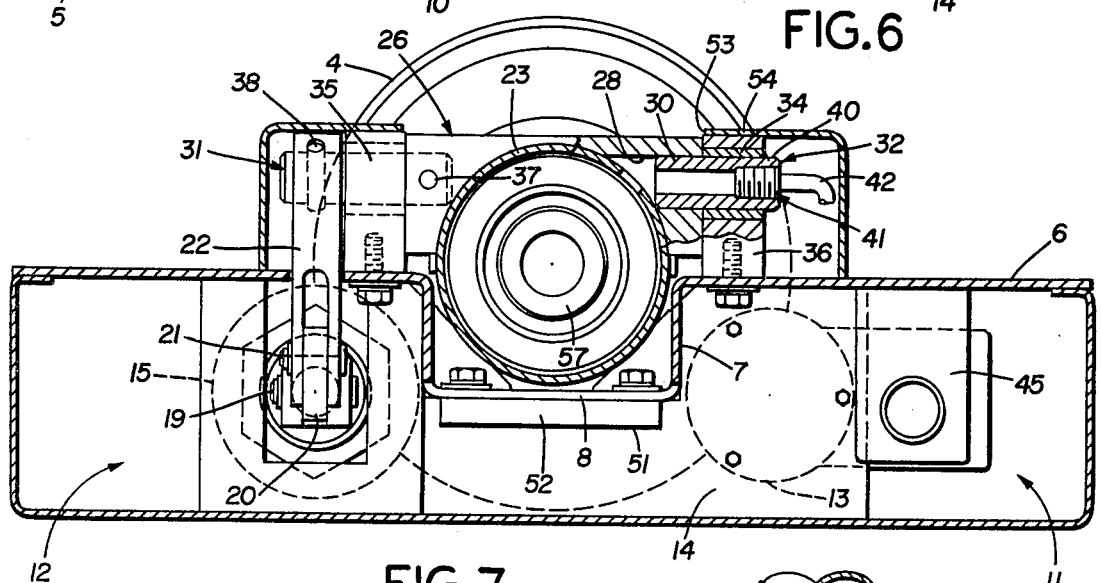
FIG.7
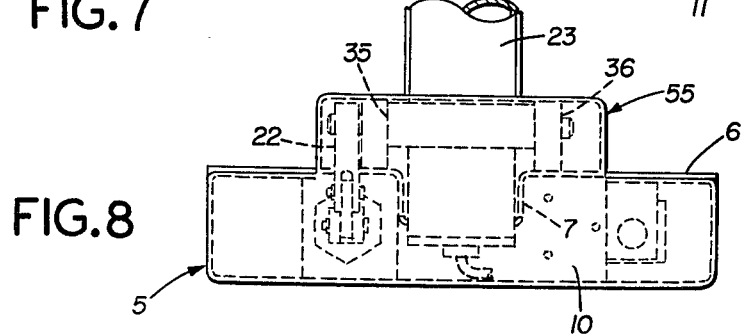
FIG.8

PNEUMATICALLY ACTUATED TILTING TELESCOPING MAST CONSTRUCTION

CROSS-REFERENCE TO RELATED PATENT APPLICATION

The new mast construction is an improvement upon the device disclosed in our copending application, Ser. No. 368,760, filed Apr. 15, 1982, (WB-A), and may utilize the same basic pneumatic system and the same or similar pneumatic and electrical control devices as those disclosed in said copending application.

BACKGROUND OF THE INVENTION

1. Field of the Invention

The invention relates to tilting and telescoping mast mechanism which may be mounted readily on the roof of a vehicle for positioning electrical devices, particularly emergency lighting fixtures, high in the air at any location that may be reached by the vehicle where use of the electrical device is desired. More particularly, the invention relates to a mast construction provided with an improved construction of seal slidably engaged between the tubular lower end of each telescoping mast section and the tubular mast section telescopically surrounding such lower end, wherein the seal construction and its mounting on the end of any tubular mast section provides a full open, obstruction-free tubular passage at the end of such mast section.

More particularly, the invention relates to a new telescoping mast construction wherein the full open, unobstructed mast section ends and passages permit circuitry wiring for control of electrical devices or fixtures mounted on the mast to pass within and through the telescopic tubular mast sections, and wherein pneumatic system air pressure is unobstructed in extending and retracting the mast.

Also, the invention relates to a tilting, telescoping mast construction wherein the mast-actuating components are housed in a housing to substantially completely protect the same from atmospheric and weather conditions which may be encountered in the operation of emergency vehicles during all seasons of the year.

2. Description of the Prior Art

The mast construction disclosed and claimed in our above-identified copending application solves problems that had been long-standing in the use of emergency vehicles having movable floodlighting equipment and other electrical devices mounted thereon. The prior art discussed therein is not relevant to the new mast construction features disclosed herein which comprise improvements in the construction and operation of the devices set forth in our said copending application.

The mast construction of the present invention incorporates a new seal device for the slidable tubular joints between telescoping mast sections, which eliminates obstructions heretofore characterizing prior telescoping masts, the mounting of seals for which obstructions have projected at least in part laterally across the lower open ends of all of the mast sections.

Elimination of such obstructions permits the tubular passages or channels through the telescoping mast sections to be used to house electrical wiring for the electrical fixtures mounted on top of the mast. Thus, retractable power cords may be located within and extended or retracted within the telescoping mast. Removal of such retractable power cords from outside of the mast is a distinct benefit because the mast protects the power cords from cord damage to which outside mounted cords may be subjected.

Futher, the outside mast location of retractable power cords in the telescoping mast construction of our above-identified copending application presents problems in connecting cords with the mast top-located electrical fixture as well as with the battery-generator power supply system of the vehicle on which the mast is mounted. The location of a power cord in the improved construction, extending in an unobstructed manner through the tubular telescoping mast sections permits the use of simple electrical plug connector devices at the top and bottom of the mast at the ends of the retractable power cord therein. A mating electrical plug connector then is used to couple the electrical fixture to the retractable power cord at the top of the mast, and similarly another mating plug is used to connect the power supply to the retractable power cord at the lower end of the mast.

As a precaution to insure unimpeded retractability of the air-pressure-actuated telescoping mast of our above-identified copending application, the pneumatic-actuating system and valving requires air pressure connections to the mast-tilting actuating cylinder at both sides of the double-acting piston. This requirement is avoided in the improved construction disclosed herein, wherein valving is simplified and an air pressure connection to the actuating cylinder at the cylinder head side of the piston is eliminated.

This pneumatic system simplification arises by locating the pivot axis on which the mast is tilted at a position laterally offset from the longitudinal axis of the mast, that is, preferably on an axis at right angles to the longitudinal axis of the mast and substantially tangential to the lower tubular end of the outer telescoping mast section. This offset location of the mast-tilting axis has been discovered to enable the mast, after the mast has retracted from extended position, to tilt by gravity on the offset axis from vertical to horizontal stored mast position. Tilting is initiated by exhausting air pressure from the mast-actuating cylinder which are pressure previously tilted the mast from horizontal position to vertical position and held the mast at such vertical position when extended telescopically.

Another difficulty encountered in use of the mast construction of our above-identified copending application involves direct exposure of some of the mast-actuating components to the elements when mounted on an emergency or other similar vehicle when traveling to and located at an area where the mast-mounted fixture is used. This difficulty is overcome with the new construction of the present invention wherein the mast-actuated components all are substantially completely protected within the mast housing.

The various described constructions and arrangements characterizing the present invention thus eliminate problems encountered in the construction and use of the telescoping mast disclosed in our above-identified copending application.

SUMMARY OF THE INVENTION

Objectives of the invention thus include providing a new seal construction for the slidable joint between the lower end of each telescoping mast section and the next outer mast section; providing such new mast construction in which the new seal enables the lower ends of all telescoping sections to be completely open and free of all obstructions; providing such new mast construction wherein retractable power cords may be located within the unobstructed tubular passage within the mast sections for extension and retraction along with such mast movement; providing such new mast construction wherein simple electrical plug-in connectors may be used at the ends of the telescoping mast for connecting the power cord to an electrical fixture at the top of the mast and at the lower end of the mast to the power supply of the vehicle on which the mast may be mounted; providing such new mast construction with an offset pivot axis on which the mast is tilted when retracted between horizontal and vertical positions so that the pneumatic-actuating system and components may be simplified and the force of gravity used for tilting the mast when retracted from vertical to horizontal position; providing such a mast construction wherein the components of the actuating system are protectively housed in a compact housing having a recess wherein the retracted mast is stored in horizontal position when not in use; and providing such a new mast construction combining the stated improved features in a cooperative manner which has solved problems encountered in connection with the prior constructions.

These objectives and advantages are obtained by the improved tilting telescoping mast construction for mounting electrical fixtures on a vehicle the general nature of which construction may be stated as including, in a mast of the type in which a pneumatic control system is actuated to tilt the mast when retracted between horizontal and vertical positions and to move telescoping sections of the mast when in vertical position between retracted and extended positions; wherein the improvement comprises a seal unit for the slidable joint between any pair of adjacent telescoped mast sections, including first and second seal clamping rings, the first clamping ring being mounted on the lower open end of an inner mast section of each pair of adjacent mast sections, the second clamping ring being axially adjustably engaged to and within the first clamping ring, said first and second rings having axially spaced annular surfaces forming a circumferentially open groove at the lower axially open end of said inner mast section; a flexible seal ring in said groove U-shaped in cross section with U-legs annularly, axially open at the end of said inner mast section; and an O-ring in said groove at the open "U" of said U-legs clamped axially between the first and second clamping rings to press the O-ring into the axially open "U" of the U-legs of the U-shaped seal ring to circumferentially press the seal ring against the inner surface of the other mast section of the pair of adjacent mast sections; whereby the seal units at the lower ends of the telescoped mast sections present circular, full, unobstructed openings for such mast sections providing an unobstructed passage from end to end of the mast at all times whether telescopically retracted or extended.

BRIEF DESCRIPTION OF THE DRAWINGS

A preferred embodiment of the invention-illustrative of the best mode in which applicants have contemplated applying the principles—is set forth in the following description and shown in the drawings and is particularly and distinctly pointed out and set forth in the appended claims.

FIG. 5 is a view similar to FIG. 4 but showing a fragmentary portion of the mast tilted to vertical position;

FIG. 6 is an end view looking in the direction of the arrows 6—6, FIG. 2, with the mast in stored horizontal position;

FIG. 7 is a sectional view taken on line 7—7, FIG. 3;

FIG. 8 is an elevation view similar to FIGS. 6 and 7 taken on the line 8—8, FIG. 5, showing a fragmentary portion of the mast in vertical position;

FIG. 9 is a longitudinal sectional view of the mast assembly detached from its housing mounting, with the telescopic sections of the mast in retracted position;

FIG. 10 is an enlarged sectional view of a portion of FIG. 9 primarily illustrating the new seal component construction;

FIG. 11 is a sectional view looking upward into the mast taken on the line 11—11, FIG. 10;

Similar numerals refer to similar parts throughout the various figures of the drawings.

DESCRIPTION OF THE PREFERRED EMBODIMENT

Figure 1:
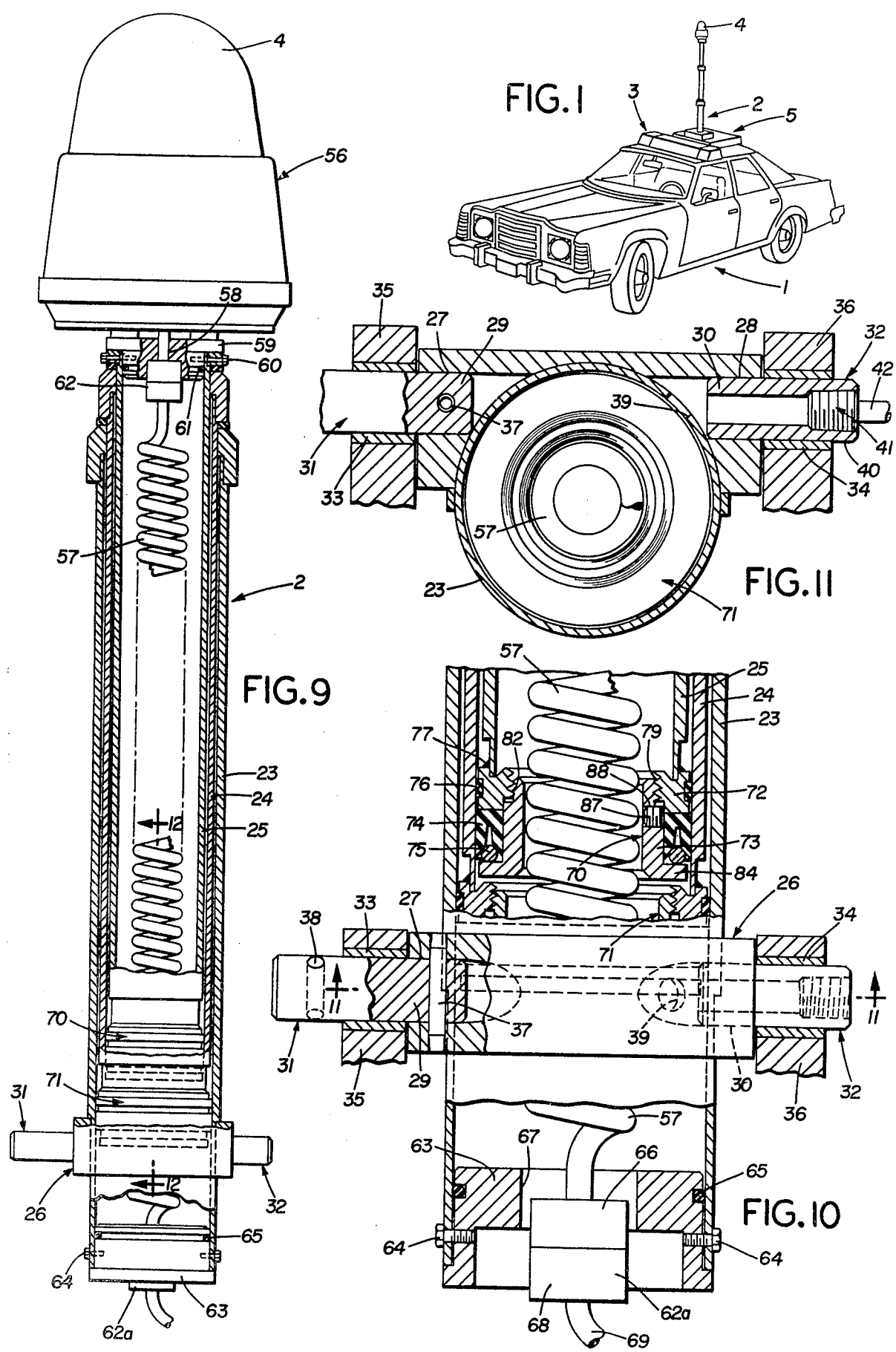
FIG. 1 is a somewhat diagrammatic perspective view of an emergency vehicle equipped with the new telescopic mast provided with the improvements of the present invention.

A vehicle such as an emergency vehicle or police car is indicated generally at 1 equipped with the new tilting telescoping tubular mast construction indicated generally at 2, in association with a typical police car light bar generally indicated at 3. Although the light bar may or may not be present in installing a mast 2, in either event, either or both of the components are installed in any suitable manner as shown in FIG. 1 on the roof of te vehicle 1 such as the usual manner in which light bars are installed on the roofs of police cars.

In such installations the only intrusion to the body of the car is for electrical wiring connecting the light bar with the vehicle power supply battery and generator. This same known mode of providing a power supply to the outside of the roof of a vehicle may be used to supply power to the mast 2 whether or not a light bar is present.

The mast 2 in accordance with the invention carries an electrical fixture such as a floodlight 4. However, a tilting telescoping mast 2 may have other devices electrical in nature mounted thereon instead of a floodlight, such as microwave antenna devices; direct beam lighting equipment, wide range floodlights; air pollution sampling devices; seismographic instrumentation; weather watching and gauging instruments; infrared sensor devices; radar sensors; and fiber optical instruments. Such devices, accordingly, are referred to herein as electrical fixtures even though a floodlight 4 is illustrated as representing such an electrical fixture.

The invention, as previously stated, involves improvements in tilting telescoping tubular mast construction, and in particular, masts which are pneumatically activated to provide both tilting and telescoping movements such as the type of mast disclosed in our copending application Ser. No. 368,760, assigned to the Assignee of the present invention and application and incorporated herein by reference in its entirety.

Figure 2:
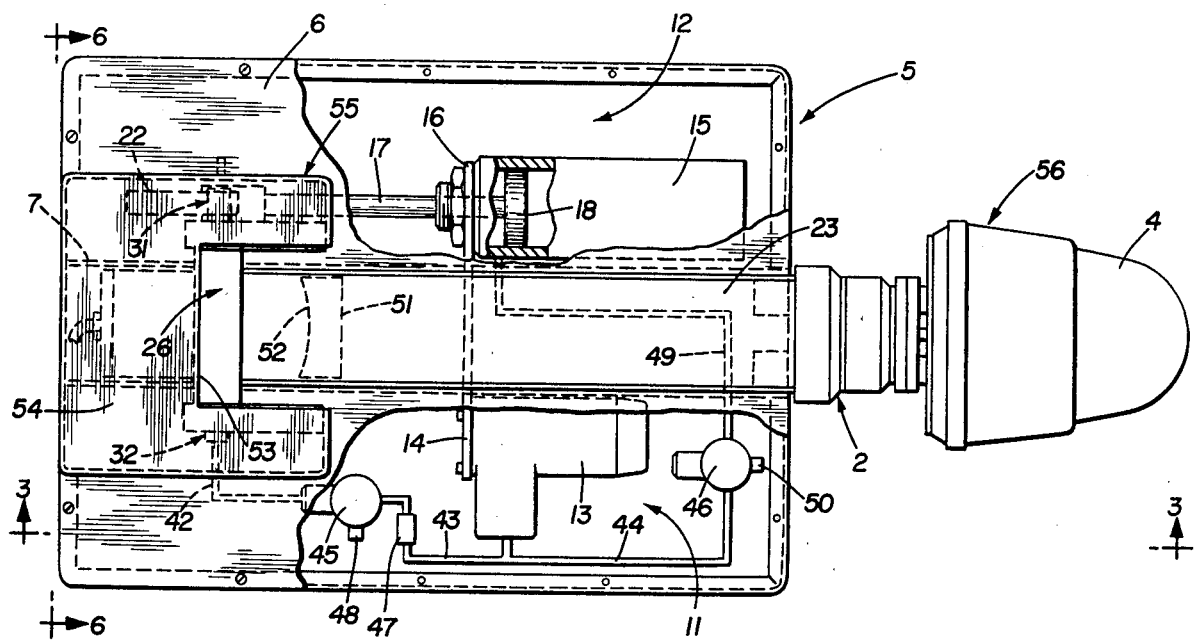
FIG. 2 is a top plan view of the telescopic mast mounted in a housing, adapted to be mounted on the roof of a vehicle with the mast retracted compactly in horizontal stored position in a recess of the housing.
Figure 3:
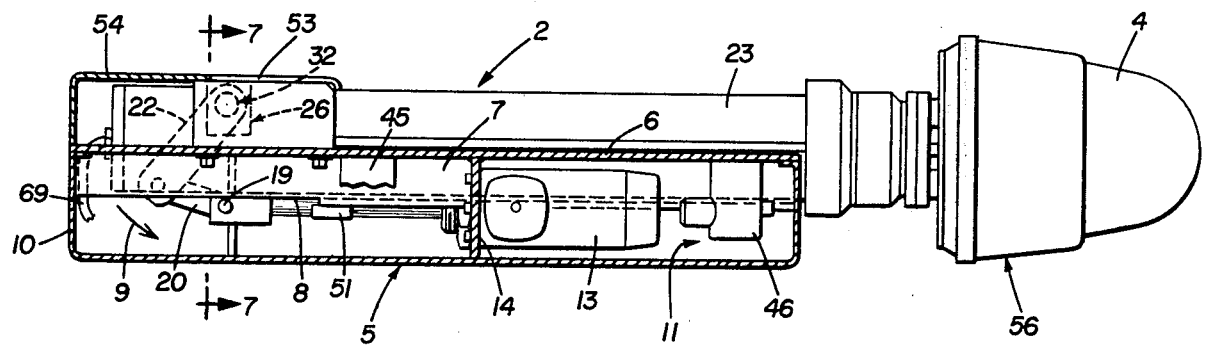
FIG. 3 is a sectional view taken on the line 3—3, FIG. 2.
Figure 4:
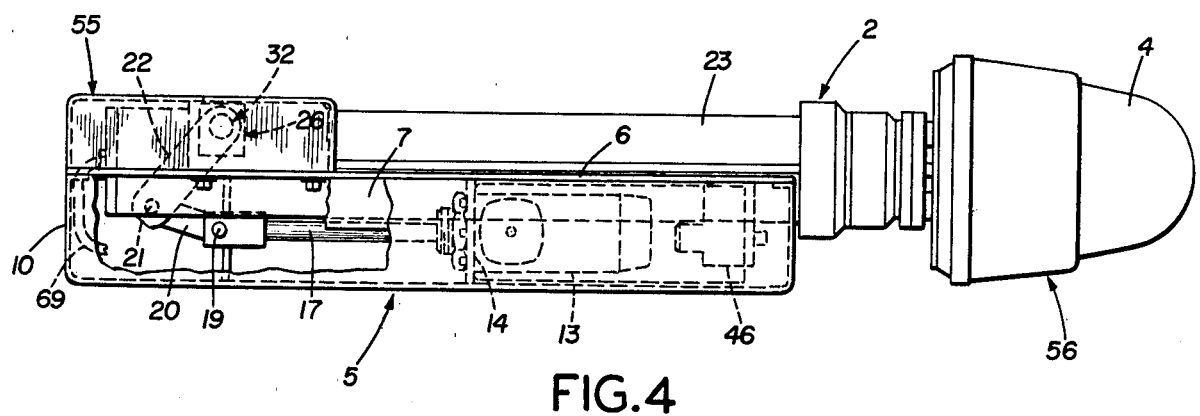
FIG. 4 is a side view of the parts shown in FIG. 2.
Figure 16:
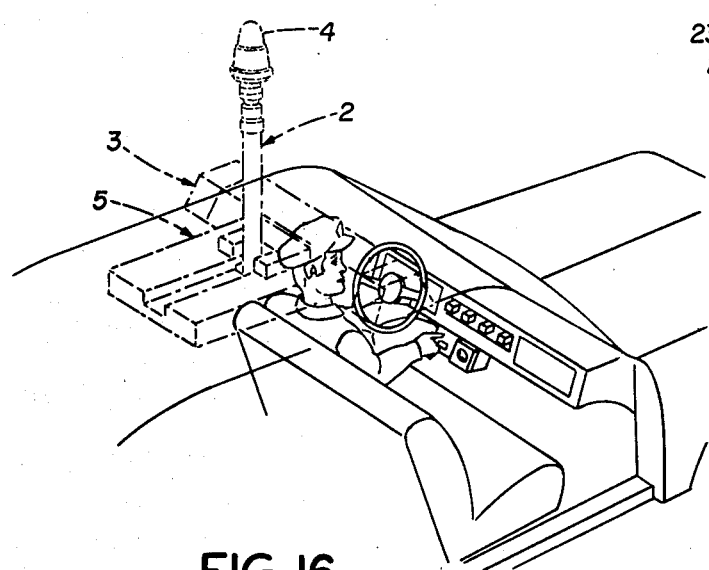
FIG. 16 is a diagrammatic fragmentary perspective view of a vehicle illustrating control devices located on the dashboard of the vehicle for actuating the mast and controlling the electrical fixture mounted on the mast.

The mast 2 has a housing generally indicated at 5 which has a top wall 6 provided with channel walls 7 forming a central depression in which the mast 2 is stored when in retracted horizontal position as shown in FIGS. 2, 3 and 4. A portion of the bottom wall of the channel 7 is cut away at 8 to permit the lower end of the mast 2 when tilted from horizontal to vertical position to swing downward in the direction of the arrow 9 (FIG. 3) into the lower part of the housing 5 adjacent the housing end wall 10.

A first compartment 11 is formed on one side of the channel 7 below the top housing wall 6 and a second compartment 12 is formed in the housing 5 at the other side of channel 7. An air compressor 13 is mounted in compartment 11 on wall portion 14 of a cross partition, and an air cylinder 15 is mounted in compartment 12 on partition wall portion 16. The outer end of the piston rod 17 of piston 18 in cylinder 15 is pivotally connected at 19 within compartment 12 to one end of link 20, the other end of which is pivoted at 21 to lever 22.

Telescoping mast 2 has a plurality of telescoping sections, three being indicated in FIG. 9 including an outer section 23, an intermediate section 24, and an inner section 25. The number of mast sections depends upon the desired height of the top of the mast when extended and thus in any mast there may be additional intermediate sections.

A saddle generally indicated at 26 is mounted on the lower end of outer mast section 23 (FIGS. 9, 10 and 11) on one side thereof. This provides a pivotal mounting on the housing 5 for the mast 2 offset laterally of the axis of the mast 2. The saddle 26 is formed with openings 27 and 28 for receiving spaced opposed ends 29 and 30, respectively, of stub pivot shafts generally indicated at 31 and 32. The stub shafts 31 and 32 are journaled at 33 and 34, respectively, in pillow blocks 35 and 36 mounted on the top wall 6 of the housing 5.

The end 29 of stub shaft 31 in opening 27 is pinned at 37 to saddle 26, and the outer end of stub pivot shaft 31 is pinned at 38 to the end of lever 22 (FIGS. 4 and 6). Thus, the lever 22 is fixed to the outer mast section 23 so that the mast rotates on its offset pivotal connection on the housing between horizontal stored position of FIGS. 2, 3 and 4 and vertical position of FIG. 5 when moved in either direction as represented by the arrow 9 which indicates counterclockwise movement from horizontal to vertical position of the mast on offset pivot shafts 31 and 32.

Pivotal movement is imparted to mast 2 by movement of the piston 18 in cylinder 15, the piston rod 17 being shown in its extended position in FIG. 4 having moved the mast 2 to horizontal position through link 20 and lever 22.

The construction of the stub shaft 32 differs from that of the stub shaft 31 in that stub shaft 32 is hollow or tubular and communicates through opening 39 with the interior of outer mast section 23.

The outer end 40 of tubular stub shaft 32 has swivel packing gland connection, generally indicated at 41, with a pneumatic tube 42 which supplies air pressure for telescopically extending the mast 2 when in vertical position.

Compressor 13 supplies air under pressure through branch tubes 43 and 44 to 3-way solenoid valves 45 and 46, respectively. A check valve 47 is located between valve 45 and compressor 13, and valve 45 has a vent opening 48. The 3-way valve 46 has an air pressure supply tube 49 connected with air cylinder 15 on the piston rod side of piston 18, and valve 46 has a vent opening 50. The operation of the pneumatic system is described below.

Air under pressure is admitted to cylinder 15 to tilt the mast from the stored horizontal position of FIGS. 2, 3 and 4 to the vertical position of FIG. 5. Piston 18 moves to the right in cylinder 15 and the lower end of the mast 2 moves in the direction of the arrow 9 until the mast reaches a vertical position as shown in FIG. 5.

Preferably a stop member 51 with a slightly curved face 52 is mounted on the web of channel 7 at the edge of the channel cutout 8 (FIG. 3) to arrest movement of the mast when it reaches vertical position in retracted condition. In this condition the upright but telescoped mast extends above the top housing wall 6 and through a cutout portion 53 in the top wall 54 of the housing cap member 55 which encloses the pillow blocks 35 and 36, the pivot stub shafts and lever connection with the piston rod 17 and the pneumatic tube connection through hollow stub shaft 32.

In accordance with the invention a floodlight or other electrical fixture generally indicated at 56 is mounted on top of the mast 2 and is supplied with power from the vehicle power supply battery-generator through a retractable or coil cable 57 which is located in and extends between the upper and lower ends of the mast 2. Preferably ends of the power supply cable 57 are equipped with plug connectors, a plug receptacle 62 at the upper end of the mast and a plug 62a at the lower end of the mast which are received in mating plug components of known types in a usual manner.

The plug receptacle 62 at the top of the mast may be mounted in a central opening 58 in a top mast tube plug 59 secured by bolts 60 to the upper end of the inner mast tube section 25. Preferably an O-ring seal 61 carried by tube plug 59 engages the inner tubular surface of the inner mast section 25 at its upper end. The floodlight 56 is bolted in any suitable manner on the top mast tube plug 59 and has its electrical connector plugged into the connector receptacle 62 at the upper end of the cable 57.

Similarly a removable base mast tube plug 63 is inserted into the lower open end of the outer mast section 23 (FIG. 9) and is bolted thereto with bolts 64. An O-ring seal 65 is interposed between the base plug 63 and the interior of mast section 23. An electrical connector plug 66 on the lower end of cable 57 may extend into opening 67 and have plug connection with a plug receptacle 68 therein connected by cable 69 with the vehicle power supply.

Another aspect of the new pneumatically actuated tilting telescoping mast construction involves the construction and mounting of new seal units for sealing the sliding joints between adjacent telescoping mast sections of the mast 2; and the coordination thereof with other mast components by which the mast is internally open throughout its length from end to end at all times whether retracted or extended or moving between such conditions.

This internally open characteristic permits the retractable cable 57 to be used and located inside the mast. Further, since such cable can be located inside the mast it is unnecessary to use a shielded cable which otherwise if outside the mast would require a metal envelope for such power conductors.

Figure 12:
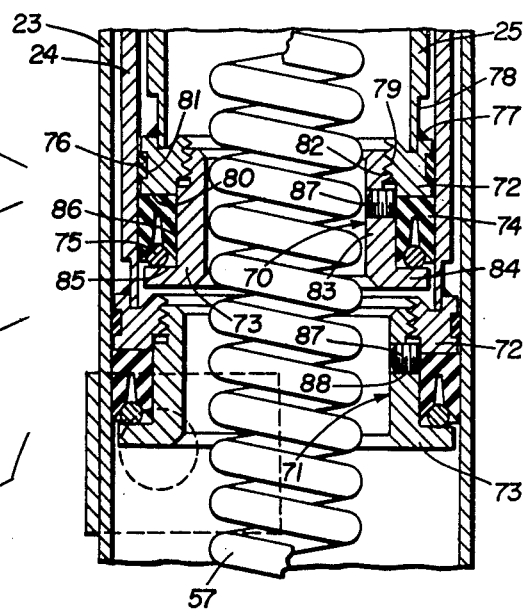
FIG. 12 is an enlarged fragmentary section view of the lower end of the mast looking in the direction of the arrows 12—12, FIG. 9.

The seal units are best illustrated in FIGS. 9, 10 and 12. Two seal units are indicated generally at 70 and 71 in FIG. 12, the upper seal unit 70 only being shown in FIGS. 9 and 10 where parts of the mast are broken away to illustrate the seal units. The seal unit 70 is mounted on the lower end of the telescoped mast section 25, while the seal unit 71 is similarly mounted on the lower end of the intermediate mast section 24. The seal units 70 and 71 are adjacent one another when the mast is in retracted condition. Further, the seal units 70 and 71 are the same in construction and operation, excepting that the components of seal unit 71 are of larger diameter than those of seal units 70.

Although the mast 2 illustrated in the drawings contains only three telescoping sections 23, 24 and 25, where a mast has more than a total of three sections or more than one intermediate section, a similar seal unit will be mounted on the lower end of each additional intermediate section.

For purposes of description the details of construction and mounting of each seal unit is described primarily with reference to the seal unit 70 mounted on the lower end of the inner mast section 25.

The seal unit 70 is composed of an open butt plate 72, an open butt plate bolt 73, a flexible seal ring U-shaped in cross section 74, a typical O-ring 75 and a Delrin wear ring 76. The open butt plate 72, which functions as a clamping ring, is mounted on the lower open end of the inner mast section 25 by welding at 77 a flange on member 72 to and around an outer annular recess 78 formed at the lower end of the inner mast section 25. The member 72 is internally threaded at 79 and has a preferably flat annular lower end surface 80. The Delrin wear ring 76 is located in a circumferential groove 81 formed in the outer surface of butt plate 72.

The open butt plate bolt 73 also functions as a clamping ring and is adjustably connected with member 72 by threads 82 at the upper end of its cylindrical body portion 83 terminating at its lower end with an out-turned flange 84 having an annular flat surface 85 spaced below and facing the flat end surface 80 of member 72. The members 72 and 73 thus, when adjustably connected together, form a circumferentially open groove 86 at the lower axially open end of the inner mast section 25.

The flexible U-shaped seal ring 74 may be formed of urethane or other elastomeric material and is located in the groove 86 with its annular U-legs opening axially downward from the lower end of the inner mast section 25. The O-ring is also located in the groove 86 at the open "U" of said U-legs clamped axially between the members 72 and 73 to press the O-ring into the axially open "U" of the U-legs of U-shaped ring 74.

Relative adjustment of the threaded connection between members 72 and 73 exerts axial pressure on the U-ring 74 and O-ring 75 between the flat surfaces 80 and 85, respectively, of members 72 and 73 to circumferentially radially press the seal ring 74 against the inner surface of the intermediate mast section 24.

In assembling members 72 and 73, ring 73 is adjusted axially to provide the desired sealing pressure of the seal ring 74 against the next adjacent mast section within which the inner mast section of a pair, carrying a seal unit, is located.

When the desired clamping pressure on the seal ring 74 is established, the two members 72 and 73 are locked together in adjusted position by a setscrew 87 in the threaded opening 88 formed in the cylindrical body portion 83 of member 73.

As stated, the seal unit 71 mounted on the lower end of the intermediate mast section 24 is composed of the same components assembled in a similar manner and functioning in the same way as those of the seal unit 70.

The seal units 70 and 71 locate open clamping rings on the lower ends of each telescoped mast section within the outer section 23, and present circular, full, unobstructed openings for such mast sections which in turn provide an unobstructed passage from end to end of the mast at all times whether telescopically retracted or extended.

The operation of the equipment is controlled by switches such as described in said copending application Ser. No. 368,760, which may be mounted on the dashboard of the vehicle shown in FIG. 1. These switches are in an electrical control system which is supplied by power from the vehicle battery-generator power supplied. One switch may control compressor 13, and others may control solenoid valves 45 and 46.

Figure 13:
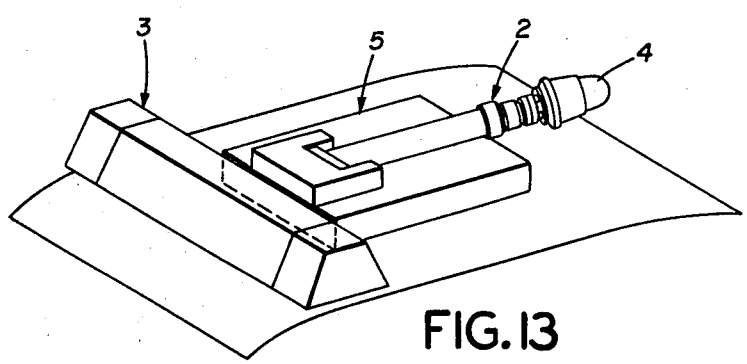
FIG. 13 is a diagrammatic perspective view of the mast construction installed on the roof of a vehicle with the mast in compact horizontal stored position.

Assume that the mast is in the stored retracted horizontal position of FIGS. 2 and 13, the compressor switch is actuated to energize compressor 13 which supplies air pressure to solenoid valves 45 and 46. Solenoid 46 is then actuated and through air line 49 supplies air pressure to cylinder 15 to drive piston 18 to the right (FIG. 2) which rotates the mast 2 about its pivot axis counterclockwise in the direction of the arrow 9 from horizontal to vertical position.

Figure 14:
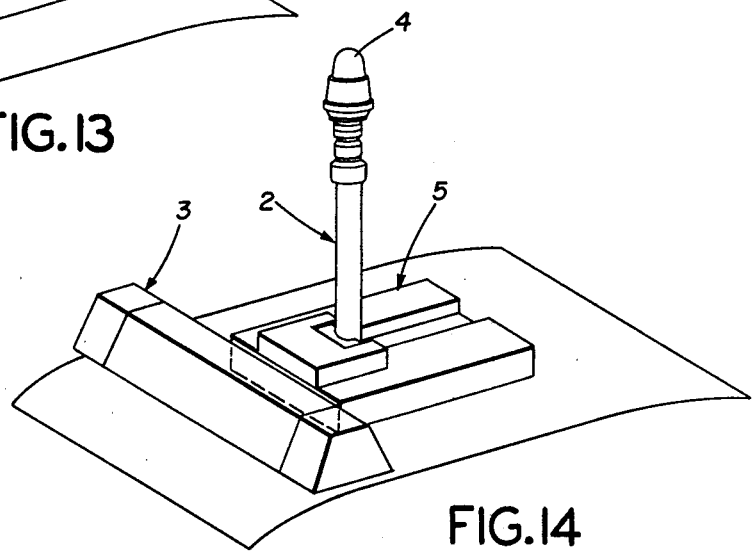
FIG. 14 is a view similar to FIG. 13 showing the mast tilted to vertical position ready to be extended from retracted position.
Figure 15:
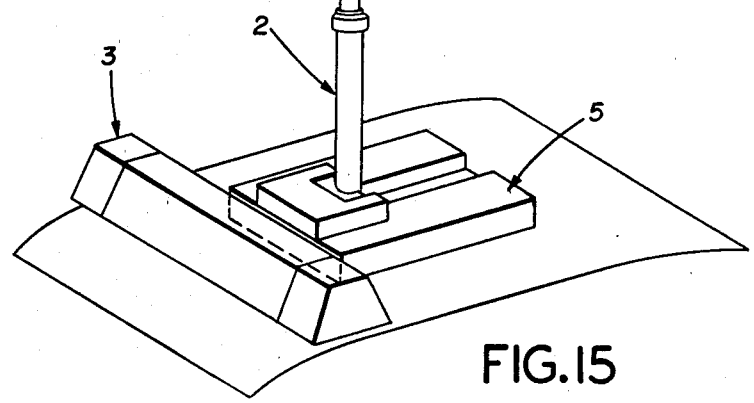
FIG. 15 is a view similar to FIGS. 13 and 14 showing the mast in extended vertical position as in FIG. 1.

The solenoid valve 45 then is actuated to supply air pressure into the lower end of outer cylinder section 23 which extends the mast 2 from the retracted position of FIG. 14 to the extended position of FIG. 15. Check valve 47 retains the air pressure in mast 2 which maintains the mast extended as long as desired.

The mast is retracted by actuating solenoid valve 45 to permit air to escape from within the mast through the vent 48 of valve 45, the mast sections telescoping by gravity until reaching the retracted vertical position of FIG. 14. At this time solenoid valve 46 is actuated to permit air to escape from cylinder 15 through the vent 50 of valve 46. The offset location of the pivot of the mast on stub shafts 31 and 32 enable the mast to tilt by gravity from the vertical position of FIG. 14 to the horizontal stored position of FIG. 13. This feature of the offset pivot mounting of the mast avoids the necessity of driving the mast clockwise on its pivot axis by supplying pressure to the cylinder head side of piston 18 in cylinder 15, and eliminates the requirement of valving to provide such pneumatic system connection with the cylinder head of cylinder 15.

Further, the offset pivot mounting of the mast 2 also enables air pressure to be introduced into the mast in a simple manner through the hollow stub pivot shaft 32 and through the opening 39 in the side wall of outer mast section 23 (FIG. 11).

The 3-way solenoid valves 45 and 46 may be ASCO Bulletin 8320 products of Automatic Switch Co., Florham Park, N.J. 07932. The retractable cord 57 may be a product of Autac, P. O. Box 1302, New Haven, Conn. 06505. The compressor 13 may be a typical known compressor such as a Thomas 12-volt motor-operated compressor supplied with power from the vehicle battery-generator system.

Accordingly, the new mast construction of the invention provides improvements in pneumatically actuated tilting telescoping masts wherein new seal units are mounted on the lower ends of each of the telescoping mast sections within the outer section, leaving the ends of such mast sections completely open between the ends of the mast whether retracted or extended, enabling a retractable cable for supplying power to an electrical fixture mounted on the mast to be located within the mast provided with plug-in electrical connectors at each end of the mast and avoiding metal shielded cables; wherein the mast is tilted in retracted position on a pivot axis offset with respect to the longitudinal axis of the mast thereby simplifying valving for the pneumatic control system and avoiding the requirement of a double-acting piston by utilizing gravity for tilting the mast on its offset pivot axis from vertical to horizontal position; wherein the mast has protective housing members substantially completely enclosing the operating and control mechanism; and thus satisfying the stated objectives, overcoming problems that have been encountered in the use of prior structures, and providing an answer to needs that have arisen in the construction and operation of pneumatically actuated tilting telescoping masts.

In the foregoing description certain terms have been used for brevity, clearness and understanding but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described, since it is manifest that telescoping masts of various sizes involving any desired number of telescoping sections may incorporate the improvements of the invention.

Having now described the features, principles and cooperative relationships of the new construction, and the advantageous, new and useful results obtained, the new structures, devices, components, elements, arrangements, parts, combinations and relationships are set forth in the appended claims.

We claim:

1. In a tilting, telescoping, tubular mast construction for mounting an electrical fixture on a vehicle and positioning the fixture at a desired location above the vehicle of the type in which a pneumatic control system is actuated to tilt the mast when retracted between horizontal and vertical positions and to move telescoping sections of the mast when in vertical position between retracted and extended positions; wherein the improvement comprises a seal unit for a slidable joint between any pair of adjacent telescoped mast sections, including first and second seal clamping rings, the first clamping ring being mounted on a lower open end of an inner mast section of each pair of adjacent mast sections, the second clamping ring being axially adjustably engaged to and within the first clamping ring, said first and second rings having axially spaced annular surfaces forming a circumferentially open groove at the lower axially open end of said inner mast section; a flexible seal ring in said groove U-shaped in cross section with U-legs annularly, axially open at an end of said inner mast section; and an O-ring in said groove at the open "U" of said U-legs clamped axially between the first and second clamping rings to press the O-ring into the axially open "U" of the U-legs of the U-shaped seal ring to circumferentially press the seal ring against an inner surface of the other mast section of the pair of adjacent mast sections; whereby the seal units at the lower ends of the telescoped mast sections present circular, full, unobstructed openings for such mast sections providing an unobstructed passage from end to end of the mast at all times whether telescopically retracted or extended.

2. The mast construction defined in claim 1 in which said seal unit first clamping ring mounted on the lower open end of an inner mast section has an annular flange welded to and around an annular recess formed in the lower end of such inner mast section; and in which said first clamping ring has internal threads and has a flat annular lower end surface.

3. The mast construction defined in claim 2 in which the first clamping ring has a circumferential groove formed in its outer surface; and in which a wear ring is located in said groove.

4. The construction defined in claim 2 in which said seal unit second clamping ring mounted on the lower open end of an inner mast section has a cylindrical body portion; in which external threads are formed at an upper end of said body portion adjustably connected with the threads of said first clamping ring; in which said body portion terminates at its lower end with an out-turned flange having an annular flat surface; and in which said out-turned flange flat surface is spaced below and faces the flat annular lower end surface of said first clamping ring; whereby threaded adjustment of the second clamping ring axially toward the first clamping ring presses said O-ring and U-shaped seal ring between said flat first and second clamping ring surfaces to circumferentially press the seal ring against the inner surface of an adjacent mast section.

5. The mast construction defined in claim 4 including lock means engaged between the first and second clamping rings when the adjustable threaded connection is in a predetermined adjusted position, to maintain the flexible U-shaped seal ring pressed between adjacent mast sections.

6. The mast construction defined in claim 5 in which said lock means comprises a radially extending threaded opening in second clamping ring having a setscrew therein engaged with the other of said clamping rings.

7. The mast construction defined in claim 1 in which a retractable cable is located and mounted inside of the unobstructed passage from end to end of the telescoped mast sections to supply power to an electrical fixture mounted on the mast.

8. The mast construction defined in claim 7 in which top and base mast plugs are mounted respectively within a top tubular end of the inner mast section and a bottom tubular end of the outer mast section; in which openings are formed in said top and base mast plugs; and in which the retractable cable has plug-in electrical plugs at its top and lower ends located in said top and base mast plug openings.

9. The mast construction defined in claim 1 including pivot shaft means mounted on the mast spaced from its lower end and offset laterally from the longitudinal mast axis, and pneumatically actuated lever means engaged with said pivot shaft means for tilting the mast on said pivot shaft means.

10. The mast construction defined in claim 1 including a housing, spaced pillow blocks mounted on the housing, and pivot shaft means mounted on the outer mast section of said mast offset laterally from the longitudinal mast axis and journaled in said pillow blocks.

11. The mast construction defined in claim 10 in which the pivot shaft means includes a saddle mounted on said outer mast section spaced above the lower end of the mast; in which the pivot shaft means includes stub shafts mounted on and fixed to said saddle in spaced axial alignment; in which outer end portions of said stub shafts are journaled in said pillow blocks; and in which pneumatically actuated lever means are connected to one of said stub shafts to rotate the mast when retracted between horizontal and vertical positions.

12. The mast construction defined in claim 11 including a source of air pressure; in which one of said stub shafts is tubular; and in which the tubular stub shaft communicates with the interior of the mast and said source of air pressure.

13. The mast construction defined in claim 12 including 3-way valve means connected with the source of air pressure and said tubular stub shaft; a check valve between a source of air pressure and said 3-way valve; the 3-way valve having a vent; pneumatic actuated lever means operatively connected with one of the stub shafts for tilting the mast on the stub shafts between retracted horizontal and retracted vertical position; and in which actuation of the 3-way valve to one position when the mast is tilted to vertical position supplies air pressure to the mast to move its telescoping sections to extended position; whereby actuation of the 3-way valve to its other position when the mast is extended permits air pressure within the mast to escape through said 3-way valve vent until the mast reaches retracted vertical position, and whereby disabling the pneumatic actuation of the mast lever tilting means enables the mast to tilt by gravity on its offset pivot shaft means from vertical retracted to horizontal retracted position.

14. The mast construction defined in claim 1 including means for pivoting the mast on an axis offset from the longitudinal mast axis to tilt the mast when retracted between horizontal and vertical positions.

15. The mast construction defined in claim 14 including a source of air pressure, and means communicating between the mast interior and the source of air pressure through the mast pivot means.

16. The mast construction defined in claim 15 including pneumatically actuated lever means engaged with the pivot means for tilting the mast on said pivot means.

17. The mast construction defined in claim 16 in which a retractable cable is located and mounted inside of the unobstructed passage from end to end of the telescoped mast sections to supply power to an electrical fixture mounted on the mast.

18. The mast construction defined in claim 1 in which a retractable cable is located and mounted inside of the unobstructed passage from end to end of the telescoped mast sections to supply power to an electrical fixture mounted on the mast; in which the mast is provided with pivot shaft means spaced from its lower end and offset laterally from the longitudinal mast axis; and in which pneumatically actuated lever means are engaged with said pivot shaft means for tilting the mast on said pivot shaft means.

19. The mast construction defined in claim 18 including a source of air pressure, and means connected between the mast interior and the source of air pressure through the mast pivot shaft means.

20. The mast construction defined in claim 19 in which the pivot shaft means, the pneumatically actuated lever means, the source of air pressure, and the means connected between the mast interior and the source of air pressure are located in housing means; and a stop member in said housing means for stopping movement of the mast when tilted to retracted vertical position.

* * * * *